US007465870B1

(12) United States Patent
Homan

(10) Patent No.: US 7,465,870 B1
(45) Date of Patent: Dec. 16, 2008

(54) ILLUMINATED HEART-SHAPED GUITAR WITH STROBE LIGHTS AND A MODIFIED BRIDGE

(76) Inventor: Randy W. Homan, 2103 Washington St., Shelton, WA (US) 98584

( * ) Notice: Subject to any disclaimer, the term of this patent is extended or adjusted under 35 U.S.C. 154(b) by 0 days.

(21) Appl. No.: 12/075,281

(22) Filed: Mar. 11, 2008

(51) Int. Cl.

| | |
|---|---|
| ***G10H 1/32*** | (2006.01) |
| ***G10H 3/00*** | (2006.01) |
| ***G10H 1/00*** | (2006.01) |
| ***G09B 15/00*** | (2006.01) |
| ***G09B 15/02*** | (2006.01) |
| ***A63J 17/00*** | (2006.01) |
| ***G10D 3/00*** | (2006.01) |

(52) U.S. Cl. ..................... 84/743; 84/477 R; 84/464 A; 84/293

(58) Field of Classification Search ................... 84/291, 84/293, 464 A, 477 R, 743
See application file for complete search history.

(56) References Cited

U.S. PATENT DOCUMENTS 3,943,815 A * 3/1976 Gilbert ........................ 84/293
4,563,933 A 1/1986 Kim
4,745,837 A 5/1988 Rimsa
4,815,355 A 3/1989 Cavaness
4,890,529 A 1/1990 Grant
5,373,768 A * 12/1994 Sciortino ..................... 84/293
5,796,025 A 8/1998 Haake
6,984,780 B2 * 1/2006 Reierson ................... 84/314 R
7,381,878 B2 * 6/2008 Cook ........................ 84/464 A
2007/0051226 A1 * 3/2007 Diaz ........................ 84/477 R

FOREIGN PATENT DOCUMENTS

GB 2329064 A * 3/1999

* cited by examiner

*Primary Examiner*—Jeffrey Donels
(74) *Attorney, Agent, or Firm*—Theresa M. Seal

(57) ABSTRACT

A guitar having a heart-shaped body with red plexiglass covering the body's top and bottom includes a fiberglass or oak neck attached to a bridge mounted to the body, with the neck including a fiberglass fret board having three extra frets for playing extra high notes with each transparent red fret marker having a LED light disposed underneath for lighting that fret marker and the fret board and a rod embedded within the neck and extending therethrough for connection to the bridge for conveying sounds through the guitar. The head includes a strobe light and connected battery pack, and cutaways on the body extend up past the fret board for easier access to the bottom frets, and the cutaways also include strobe lights actuated by strobe buttons on the back of the guitar body, with the strobe lights on the head, fret board, and cutaways capable of independent lighting and simultaneous lighting by a master strobe button on the front of the guitar for warming the musician's fingers, allowing the musician to play in poorly lighted venues or in the dark, and producing a flashing, streamlined appearance.

20 Claims, 7 Drawing Sheets

ILLUMINATED HEART-SHAPED GUITAR WITH STROBE LIGHTS AND A MODIFIED BRIDGE

FIELD OF THE INVENTION

The present invention pertains to the shape and design of a guitar, and more particularly pertains to a guitar having a modified bridge, additional frets, illuminated fret markers, parts that are separately illuminable and are composed of lightweight, durable, transparent materials.

BACKGROUND OF THE INVENTION

The guitar, whether electric or wooden, is one of the most popular of musical instruments. The basic structural parts of the guitar include a head, a neck, and a body with the head being attached to one end of the neck and the lower end of the neck being connected to the body. The neck includes tuner strings and attached to each tuner string is a string that when plucked or strummed represents and produces a sound corresponding to a specific note. On the front surface of the neck is a fret board and extending transverse thereto are 22 spaced-apart frets over which the strings extend for attachment to a bridge that is mounted on the body beside and in line with a sound hole. The strings pass over the sound hole before their connection to the bridge. It should be noted that necks for guitars in current use are either screwed or glued to the body of the guitar. Moreover, the neck includes 22 frets, and a support rod extends through the neck and is commensurate in length with the neck; and the fret board disposed on the upper surface or front of the neck is made of wood.

While the basic shape and structure of the guitar has remained the same for many decades, variations are quite common especially with the shape of the body of electric guitars wherein the bodies can have a v-shape, a box or rectangular shape, or a triangular shape. In addition, it is quite common for guitars, both wooden and electric, to be artistically embellished for enhancing their visual appeal and for providing a unique, personal touch to the instrument. The use of some type of illumination, either embedded within or externally mounted, is not uncommon when designing a guitar that displays and incorporates the personal touches and preferences of the musician. Thus, the prior art discloses a variety of guitars incorporating personal enhancements and embellishments such as illumination means.

For example, the Gilbert patent (U.S. Pat. No. 3,943,815) discloses an illuminated guitar having a fiber optic strand that extends through the neck of the guitar for illuminating fret markers on the playing surface and side surfaces of the neck.

The Kim patent (U.S. Pat. No. 4,563,933) discloses a dynamically illuminated guitar having a plurality of diodes spaced about the body of the guitar and which light up in various patterns dependent upon the actuation of mercury tilt switches that are actuation by orientation of the guitar.

The Rimsa patent (U.S. Pat. No. 4,745,837) discloses an internally illuminated electric guitar wherein the guitar is cast in various molds to produce various types of shapes, and wherein internal illumination sources are embedded within the several layers that compose the guitar.

The Cavaness patent (U.S. Pat. No. 4,815,355) discloses a color changeable guitar body that includes passages in the body through which colored liquid flows and which has the ability to change colors, and wherein the electronic parts of the guitar are waterproof.

The Haake patent (U.S. Pat. No. 5,796,025) discloses a fiberoptically illuminated electrical guitar that includes a light source located in the body and which is connected to a plurality of optical fibers that extend throughout the instrument and in which the illumination of the instrument is regulated by electrical signals generated by the pickup.

Nonetheless, despite the ingenuity of the above devices, there remains a need for a guitar that is lightweight, incorporates a streamlined design, includes a solid neck from the head to the bridge, incorporates luminous lights spaced along the fret board and beneath the fret markers, and includes additional frets at the bottom of the fret board for playing higher notes for leads in poorly lit areas.

SUMMARY OF THE INVENTION

The present invention comprehends a guitar having a heart-shaped body and a slightly longer neck for producing a streamlined design; with the body, the neck, and the head incorporating or including illumination means for producing a flashy appearance, allowing the musician to play in poorly lit areas, and in the dark, for warming the fret board so that the musician's fingers stay warm, and for coordinating the illumination of part or all of the guitar consonant with the type of song or guitar lead—slow, medium, or fast song or lead being played.

The heart-shaped guitar includes a head attached to the upper end of the neck, and the head includes a strobe (top) light and a battery pack enclosed within the head. The neck is composed of oak or fiberglass and the fret board is composed of either metal or fiberglass for producing a smoother surface and easier and truer sounding playing. The fret board includes three extra frets for playing higher notes, and each fret marker is composed of a circular red transparent member of Plexiglas®. Moreover, located beneath each fret marker is a LED light for illuminating the fret markers and warming the fret board.

The neck extends to the bridge and connects to that portion of the bridge that is enclosed within the body. A main rod is embedded within the neck and is commensurate in length with the neck and attaches to the bottom of the bridge within the body. A red transparent plexiglass plate covers the body and a red transparent key plate covers the head (of course allowing for the mounting of the tuners on the head). The body is cutout along the lower end of the neck and fret board and forms opposed cutaways that allow for easier fingering of the lowermost (three extra frets) frets on the fret board. Each cutaway includes strobe lights disposed under the red transparent plastic material that covers the top of each cutaway. It should also be noted that the sound hole is heart-shaped.

A LED button on the front of the body is pressed for lighting up the fret markers on the fret board; a push button strobe switch on the back of the head is pushed for lighting the strobe light on the head; and push buttons on the back of the body (interconnected to batteries stored in a battery compartments accessible from the back of the body) are pushed to light up the strobe lights disposed in the cutouts. Moreover, a master strobe button mounted on the front of the body beside the sound hole can be pressed to light up all of the strobe lights—on the head, along the fret board, and on the cutaways.

It is an object of the present invention to provide an improved guitar having a heart-shaped design for the body and which incorporates a flashy streamlined designed to enhance the visual aesthetic appeal of the guitar.

It is another object of the present invention to provide an improved, heart-shaped guitar that is lightweight for relieving the strain of holding up and playing the guitar for extended time periods.

It is yet another object of the present invention to provide an improved, heart-shaped guitar wherein the head, the neck, and the body are capable of selective illumination for allowing the individual to see where he is on the fret board so that he can play in the dark or in poorly lit venues.

It is still another object of the present invention to provide an improved, heart-shaped guitar that includes three extra frets extending across the bottom of the fret board of the guitar neck for allowing the individual to produce higher pitch sounds and to play extra high notes.

It is still yet another object of the present invention to provide an improved, heart-shaped guitar wherein the body of the guitar adjacent the lower part of the neck includes a pair of cutaways that allow for easier fingering so that the guitar player can more easily reach the bottommost frets.

It is still yet a further object of the present invention to provide an improved, heart-shaped guitar that includes transparent red fret markers on the fret board with one LED light underneath each fret marker for lighting the fret marker and warming the fret board so that the musician's fingers stay warm for easier playing.

Another object of the present invention is to provide an improved, heart-shaped guitar wherein the head and the body includes strobe (LED) lights that can be separately and independently actuated.

Yet another object of the present invention is to provide an improved, heart-shaped guitar wherein the fret board is composed of metal or fiberglass for easier and truer sounding playing and for providing more durability and longevity than a wooden fret board.

Yet still another object of the present invention is to provide an improved, heart-shaped guitar wherein the neck of the guitar is composed of oak or fiberglass.

Yet still a further object of the present invention is to provide an improved, heart-shaped guitar wherein the neck of the guitar is solid and extends to the bridge and is reinforced by a steel rod that extends completely through the neck to the bottom of the bridge.

A still further object of the present invention is to provide an improved, heart-shaped guitar wherein the bridge of the guitar interconnects to the rod thereby sending sound down through the guitar when it is played instead of just off the front side or top of the guitar.

A still yet further object of the present invention is to provide an improved, heart-shaped guitar wherein the illumination of the head, the fret board, and the body can correspond to the tempo (slow, medium, or fast) of the song being played.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Figure 1:
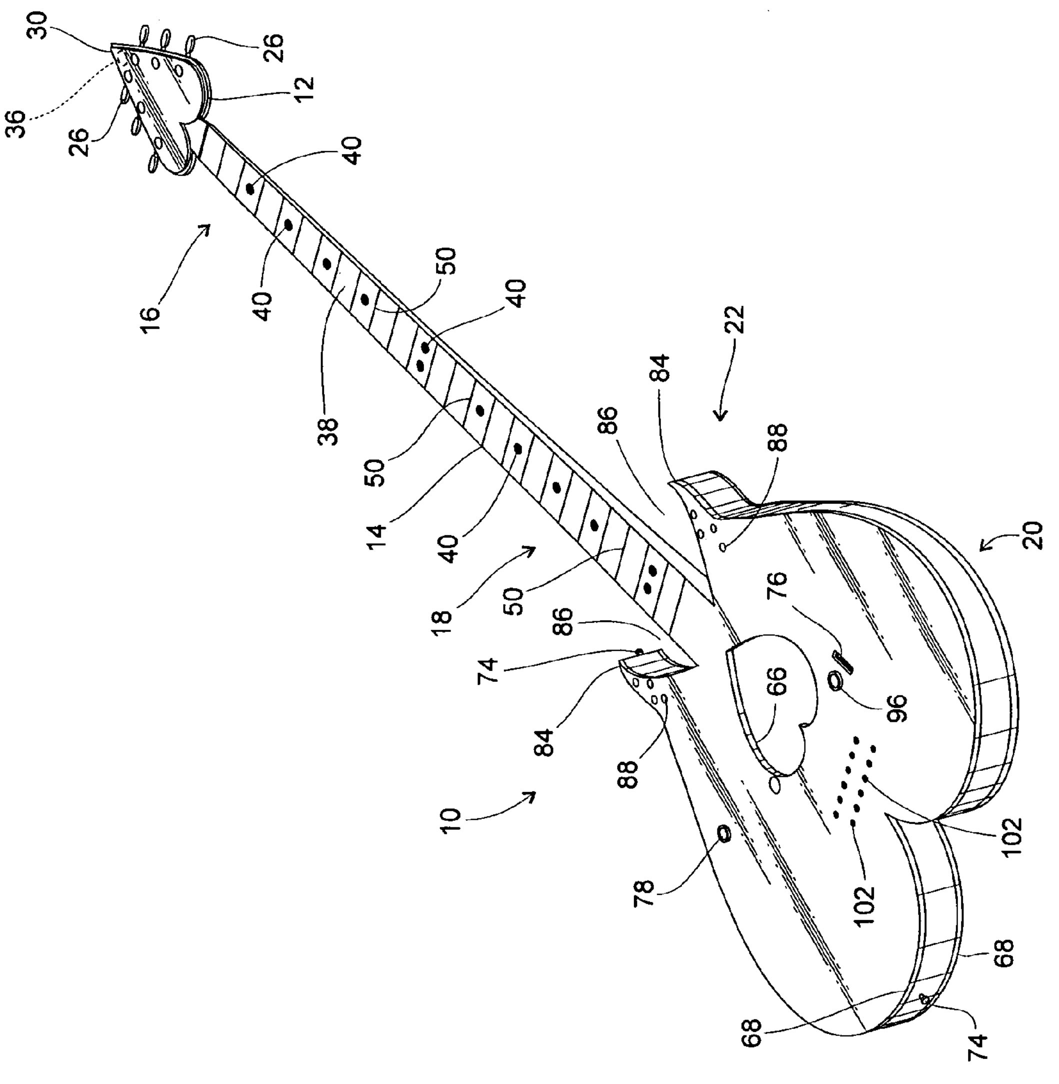
FIG. 1 is a perspective view of the illuminated heart-shaped guitar of the present invention.

Illustrated in FIGS. 1-11 is a uniquely designed and equipped guitar 10 that provides for a flashy, streamlined appearance and includes a heart-shaped body with lighted fret markers along the neck; strobe lights embedded within the head and body for producing a theatrical effect and for allowing the guitarist to play in the dark; a modified bridge, three extra frets, and a unique body and neck arrangement and shape that allows for the playing of higher lead notes and conveys sound down through the guitar instead of just off the top of the guitar.

Thus, illustrated in FIGS. 1-11 is the guitar 10 of the present invention that includes a head 12, a neck 14 having an upper end 16 that connects to the head 12 and a lower end 18 that joins to a body 20. The guitar 10 includes a front side 22 and an opposite rear side 24, and the front and rear sides 22 and 24 encompass and include the head 12, the neck 14 and the body 20. The head 12, the neck 14, and the body 20 are preferably composed of such materials as oak or fiberglass.

Figure 2:
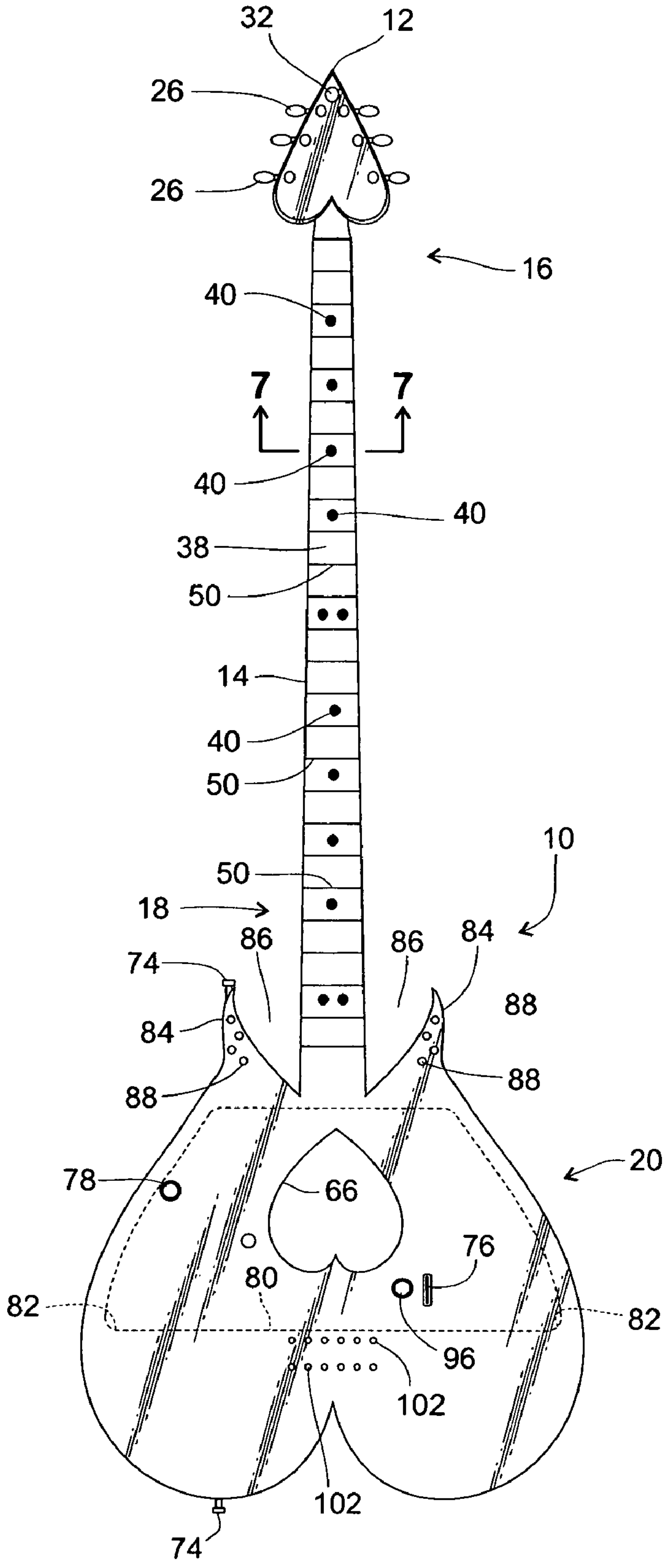
FIG. 2 is a front elevational view of the illuminated heart-shaped guitar of the present invention.
Figure 3:
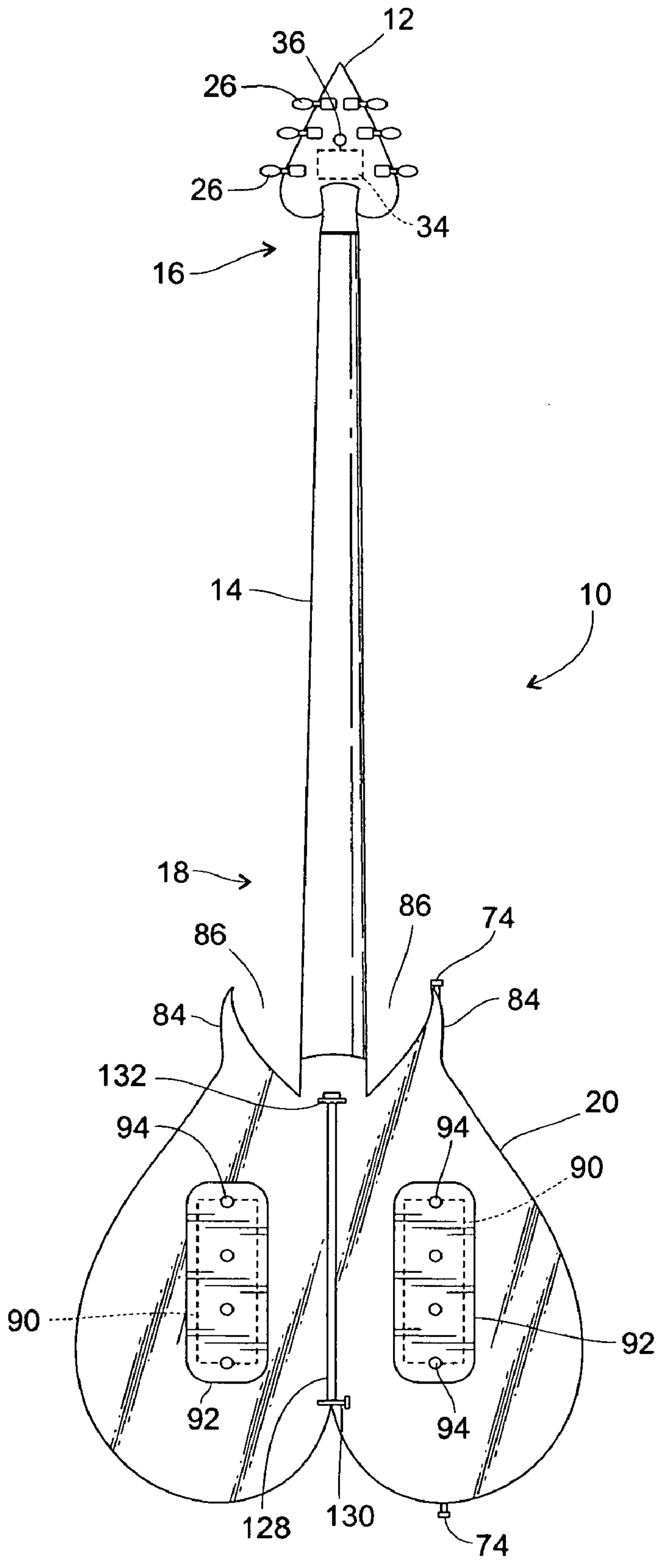
FIG. 3 is a rear elevational view of the illuminated heart-shaped guitar of the present invention.
Figure 4:
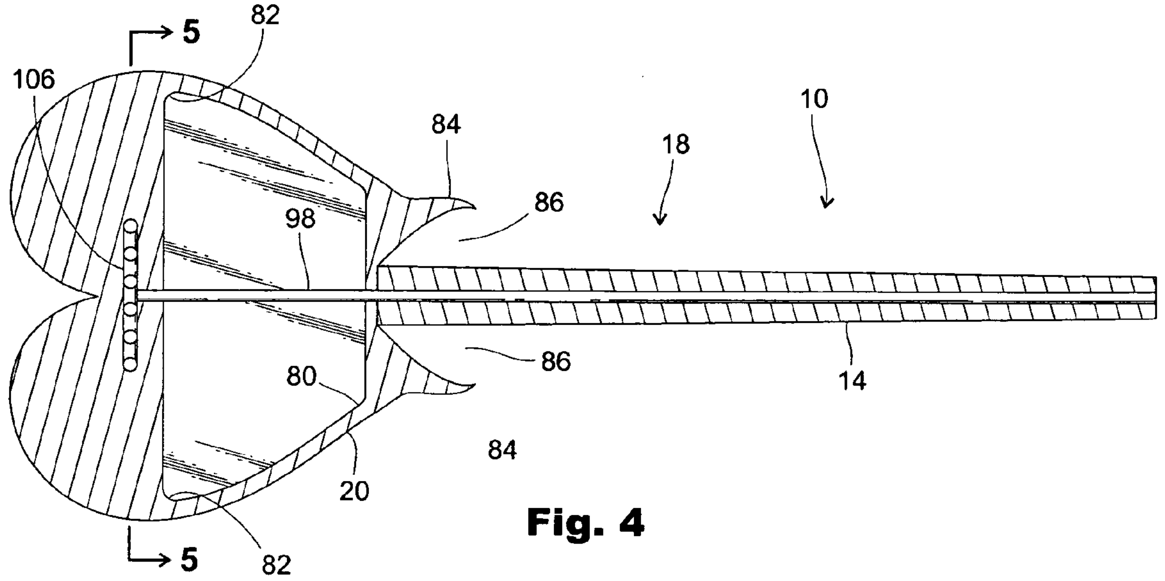
FIG. 4 is a sectioned elevational view of the illuminated heart-shaped guitar of the present invention illustrating the extension of the rod through the neck of the guitar and into the body for interconnection to the bottom of the bridge.
Figure 5:
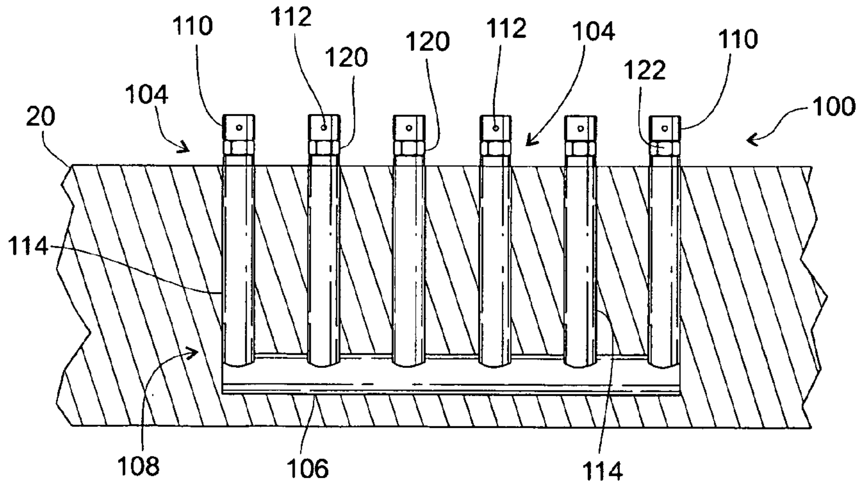
FIG. 5 is a sectioned elevational view of the illuminated heart-shaped guitar of the present invention taken along lines 5-5 of FIG. 4 illustrating the extension of the bridge string guides into the body of the guitar.

As shown in FIGS. 1-3, mounted to and projecting from the head 12 are a plurality (generally six) of tuners 26 with each tuner 26 being independently and manually adjustable for tuning the guitar strings 28 (low E-A-D-G-B- high E) attached and corresponding to the appropriate tuner 26. The head 12 is preferably composed of oak or fiberglass, and covered by a red transparent head key plate 30 at least ⅛ of an inch thick and made from a plastic material or substance such as the plastic material known by the trade name Plexiglas®. An illumination means, such as a head strobe (LED) light 32, is mounted within the head 12 and immediately beneath the transparent head key plate 30, and is electrically connected to a battery pack 34 wherein one or more appropriately sized batteries are disposed for providing power to the head strobe light 32. The battery pack/compartment 34 is accessible from the rear of the head 12, and also mounted at the rear of the head 12 is a push button strobe switch 36 for actuating the head strobe light 32.

Figure 6:
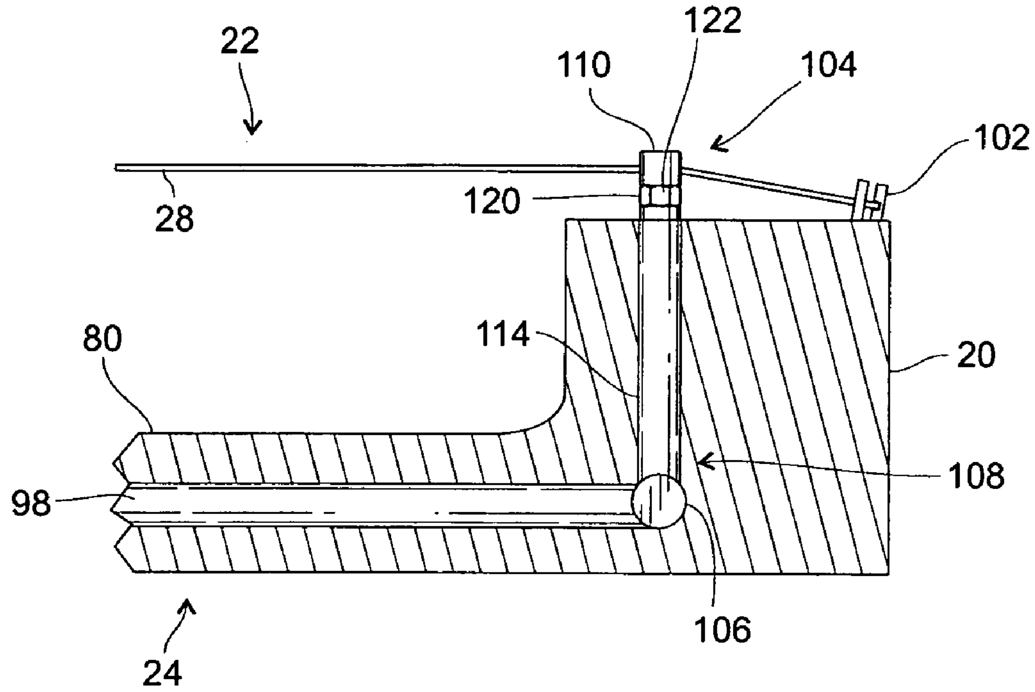
FIG. 6 is an enlarged sectioned view of the illuminated heart-shaped guitar of the present invention illustrating the attachment of one string of the guitar to the corresponding string holder of one bridge string guide.
Figure 7:
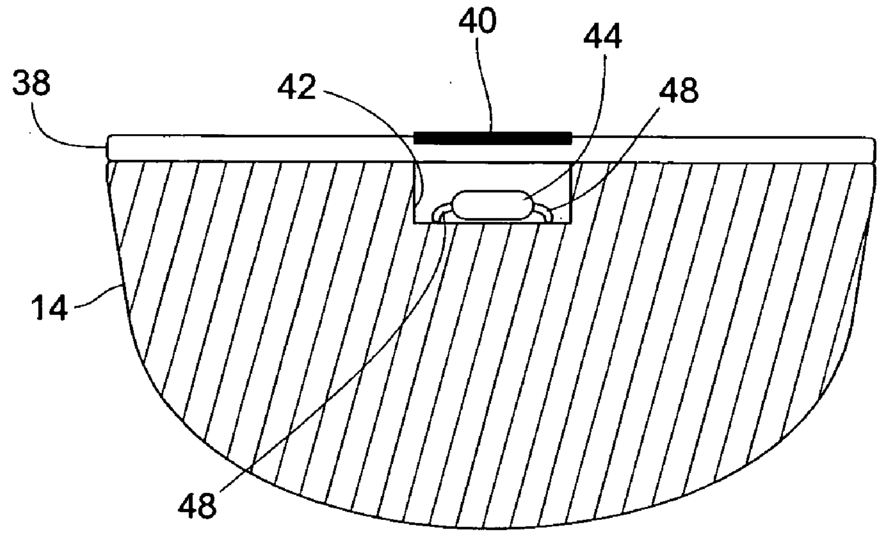
FIG. 7 is a sectioned elevational view of the illuminated heart-shaped guitar of the present invention taken along lines 7-7 of FIG. 2 illustrating one transparent red fret marker and one LED light disposed directly underneath the fret marker in a channel extending along the upper or front side of the neck of the guitar.
Figure 9:
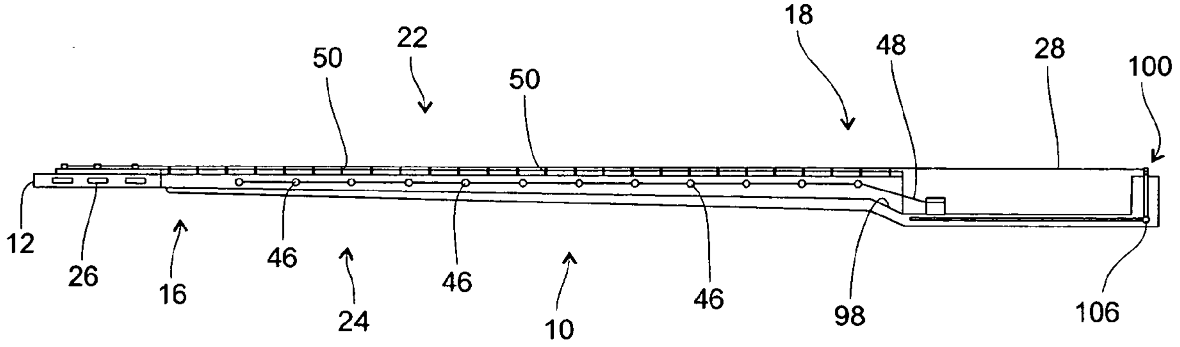
FIG. 9 is a side elevational view of the illuminated heart-shaped guitar of the present invention illustrating the integral connection of the neck of the guitar to the lower end of the bridge that is enclosed within the body of the guitar.
Figure 10:
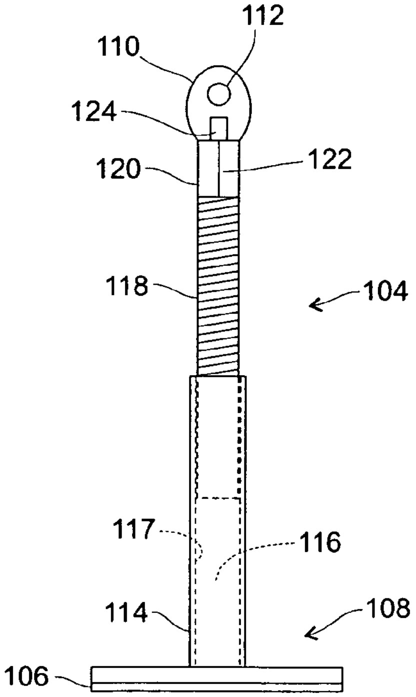
FIG. 10 is a side elevational view of the illuminated heart-shaped guitar of the present invention illustrating one string holder that connects to the t-shaped interior end of the rod.
Figure 11:
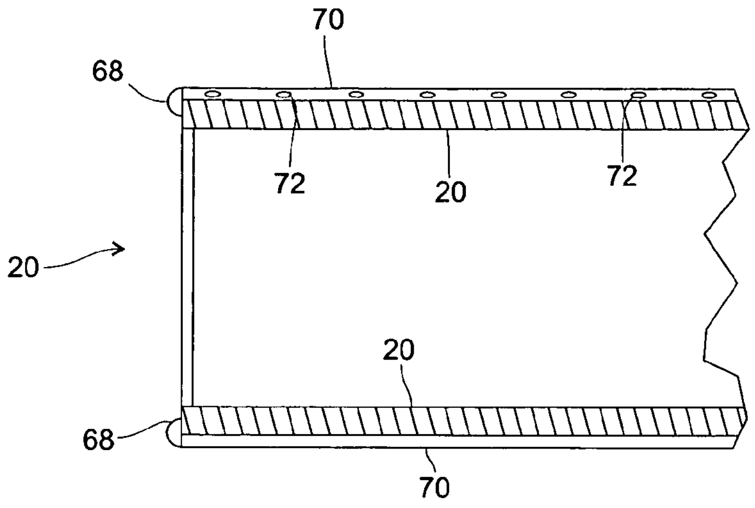
FIG. 11 is a sectioned side elevational view of the illuminated heart-shaped guitar of the present invention illustrating the various structural components of the body of the guitar.

As shown in FIGS. 1-4 and 9, the upper end 16 of the neck 14 attaches to the head 12 and the lower end 18 of the neck 14 interconnects to the body 20. Mounted on the front side of the neck 14, and coequal in length therewith, is a fret board 38 preferably of composed of a glass-type material such as fiberglass making the fret board 38 smoother than a typical wood grain fret board. As shown in FIGS. 1, 2 and 6, spaced along the length of the fret board 38 are a plurality of red transparent main or front fret markers 40. The transparent fret markers 40 are preferably made from a plastic material such as the material known by the trade name of Plexiglas®. Located immediately beneath each fret marker 40, and within a longitudinal channel 42 extending substantially down the middle of the length of the neck 14, are a plurality of fret marker (LED) lights 44, with one fret marker light 44 disposed beneath each corresponding fret marker 40. In addition, mounted to at least one side of the neck 14, as shown in FIG. 9, are a plurality of spaced-apart side transparent removable fret markers 46 (also preferably of the plastic material known by the trade name Plexiglas®), with each side transparent fret marker 46 aligned with one front fret marker 40 thereby providing access to—insertion therein or removal therefrom—of the corresponding fret marker light 44. A pair of parallel wires 48 extends along the channel 42 of the neck 14 for interconnecting the fret marker lights 44 to a power (battery) source generally located within the body 20 of the guitar 10. The battery compartment for the fret marker lights 44 will be at the rear of the body 20 of the guitar 10. The fret board 38 of the guitar 10 of the present invention includes at least the standard number of frets 50 in addition to three extra frets 50 for playing extra high notes that produce sounds of correspondingly higher pitch. As is well known and established, the shorter the distance from the fret to the bridge, the higher the pitch of the note (sound) produced by any given string when plucked, strummed, etc., and the longer the distance from the fret to the bridge, the lower the pitch of the note (sound) produced by any given string upon being plucked, strummed, etc.

Figure 8:
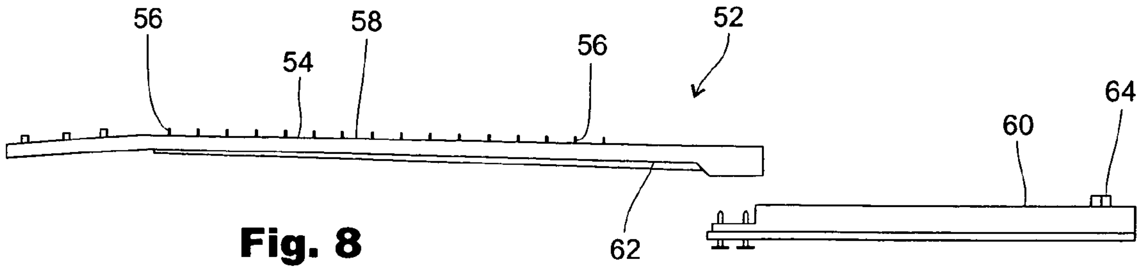
FIG. 8 is a side elevational view of a representative prior art guitar illustrating the connection of the neck of the guitar to the body of the guitar.

FIG. 8 illustrates a typical and common prior art guitar 52 having a neck 54 with 22 frets 56 spaced along the fret board 58, and a means of attachment to the body 60 of the guitar 52 that can include either gluing or screwing. The fret board 58 is made of wood, and the rod 62 only extends to the lower end of the neck 54 of the guitar 52. Moreover, the bridge 64 is glued or screwed to the front or top of the body 60 of the guitar 52.

FIGS. 1-7 and 9 illustrate the interconnection and adjoining of the neck 14 to the body 20 of the guitar 10 of the present invention that enhances the sound quality of the guitar 10 by conveying sound down through the guitar 10 as opposed to merely emitting sound off of the top or front of the guitar 10. The body 20 of the guitar 10 has a heart shape, and the sound hole 66 (the pickup location) on the front of the body 20 also is heart-shaped. As shown most distinctly in FIG. 11, the body 20 is composed of oak or fiberglass and includes edging strips 68 around its entire periphery, front and back, with the edging strips 68 preferably composed of maple wood or fiberglass. Covering the front and rear of the body 20 is a plastic transparent material that preferably is a ⅛ red transparent body front plate 70 composed of a plastic material known by the trade name of Plexiglas®. To further enhance the appearance of the guitar 10, metal flaking 72 is dispersed or spread about the front of the body 20 underneath the plastic transparent front plate 70. A pair of strap holders 74 are mounted to the upper portion of the body 20 of the guitar 10 for securing a strap (not shown) thereto. Located immediately beneath the sound hole 66 is a spare pick holder 76, and positioned above the sound hole 66 is a LED power button 78 that is pressed for actuating the fret marker lights 44 that are positioned immediately beneath the corresponding red transparent front fret markers 40 disposed along the fret board 38.

As shown in FIGS. 1-7 and 9, the body 20 includes an internal cavity 80, and the internal cavity 80 is bounded and defined by a plurality of radiused corners 82 for producing a truer and richer sound, both inside and outside of the guitar 10. As shown most distinctly in FIGS. 1-4, the body 20 of the guitar 10 adjacent the interconnection of the lower end 18 of the neck 14 to the body 20 is further defined by a pair of opposed cutaways 84 that are integrally formed from the body 20 of the guitar 10 and extend along the lower end 18 of the neck 14 toward the head 12 and past the frets 50 at the lower end 18 of the fret board 38. The cutaways 84 essentially define cutouts or open areas 86 that separate each cutaway 84 from the lower end 18 of the fret board 38 and neck 14 providing access thereto for easier fingering and getting to the lowermost or bottom frets 50, including the additional three frets 50. A plurality—at least four—cutaway strobe lights (LED lights) 88 are located on each cutaway 84 immediately beneath the red transparent front plate 70. Located within and accessible from the back or rear of the body 20 are least two battery compartments 90 covered by removable battery covers 92, that are of the magnetic clasp type, for storing therein batteries that supply power to the cutaway strobe lights 88. A plurality of individual strobe buttons 94 are integrated with the battery cover plates 90 with each strobe button 94 being associated with and actuating one respective cutaway strobe light 88. A master strobe button 96 is mounted on the front of the body 20 adjacent the spare pick holder 76 and the sound hole 66, and is electrically interconnected to the various lights on the head 12, beneath the fret board 38 and on the cutaways 84 of the body 20. Pressing the master strobe button 96 lights all of the various strobe (LED) lights—the head strobe light 32, the fret marker lights 44, and the cutaway strobe lights 88—simultaneously. Lighting all of the lights 32, 44, and 88, provides for maximum illumination of the guitar 10 and maximum stylish appearance and effect.

As illustrated in FIGS. 4-6 and 9, the interconnection and adjoining of the neck 14 to the body 20 is facilitated by a rod 98, preferably manufactured from steel, that extends completely through the neck 14 with the neck 14 extending into the body 20 so that the rod 98 joins at its inner end to the bottom of a bridge 100 with the bridge 100 being extending up through the body 20 of the guitar 10 adjacent and aligned with the sound hole 66. The bridge 100 supports the ends of the guitar strings 28 and the bottom of the bridge 100 are enclosed within the body 20 for interconnection to the rod 98. End string holders 102 secure the ends of the guitar strings 28 to the body 20 of the guitar 10. The bridge 100 includes individual bridge string guides 104 (one bridge string guide 104 for each string 28), and the rod 98 terminates at its inner end with a t-shaped portion 106 for connecting to the bottom or interior ends 108 of the bridge string guides 104. The bridge string guides 104 are selectively independently adjustable in a linear orientation (up and down) relative to the front of the body 20 for raising and lowering the guitar strings 28.

With specific reference to FIGS. 4-6, and 10, each bridge string guide 104 includes a string holder 110 having a string aperture or hole 112 through which one guitar string 28 extends and which prevents the guitar string 28 from slipping back out. A tube or sleeve 114 (six tubes in all) is connected to the t-shaped portion 106 and extends upwardly therefrom; and each tube 114 includes a passageway 116 that is annularly and internally threaded 117. The tubes 114 can be press fitted into apertures spaced along the t-shaped portion 106, or the tubes 114 can be screwed into the t-shaped portion 106 of the rod 98. Mounted to each tube 114 for threadable engagement thereto is an intermediate member 118. The intermediate member 118 is externally threaded for engaging the annular internal threads 117 of the tube 114 and each intermediate member 118 is capable of selective and independent linear reciprocable adjustable movement (up and down) within the respective tube 114. A wrench turning head 120 is fixedly mounted to the upper end of each intermediate member 118. The wrench turning head 120 includes a plurality of flat facing surfaces 122 for engagement by the jaws of a tool, such as a wrench or pliers. Centrally located thereon, and protruding upwardly from the wrench turning head 120, is a round mounting pin 124 that is inserted into a blind hole at the bottom of the string holder 110. Thus, when it is desired to adjust any particular guitar string 28 associated with any particular bridge string guide 104, the individual can manually rotate the wrench turning head 120 for initiating the linear upward or downward movement of the intermediate member 118 with respect to the fixed tube 114 thereby resulting in the string 28 being raised or lowered relative to the red transparent front plate 70 on the body 20. The string holder 110 sits upon the mounting pin 124, and thus when the wrench turning head 120 is rotated or turned, the mounting pin 124 rotates but not the string holder 110 and associated guitar string 28; while at the same time the string holder 110 moves linearly upward or downward concomitant with the upward or downward movement of the wrench turning head 120 and the intermediate member 118 with respect to the tube 114. In addition, because the bridge string guides 104 are interconnected to the rod 98 via the tubes 114, when the guitar 10 is played more sound (vibrations) is sent down through the tubes 114 to the rod 98 and through the guitar 10, instead of just transferring sound off the front or top of the guitar 10 as is the case with the standard guitar shown in FIG. 8. It should be noted that the bridge string guides 104 shown in FIG. 5 have the intermediate members 118 disposed completely within their tubes 114 so that the string holders 110 and strings 28 are at their lowest position while the representative bridge string guide 104 shown in FIG. 10 has the intermediate member 118 rotated upward and projecting from the tube 114 thereby disposing the string holder 110 and associated guitar string 28 to a raised or elevated position.

Figure 12:
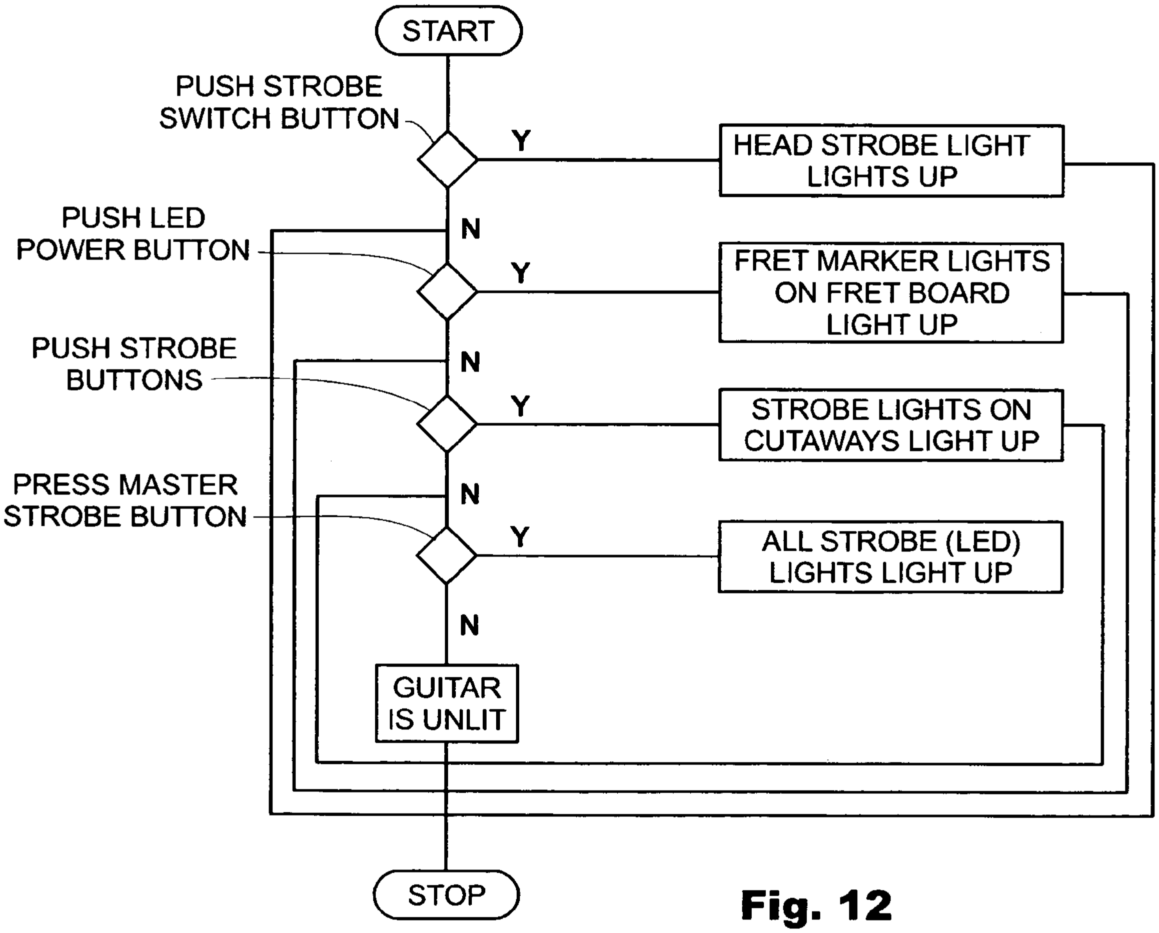
FIG. 12 is a representative schematic view of the illuminated heart-shaped guitar of the present invention illustrating the sequence of steps undertaken to actuate some or all of the strobe lights placed or embedded within the various parts of the guitar.

FIG. 12 is a representative schematic 126 illustrating one possible sequence of steps that can be undertaken by the guitarist for illuminating portions of the guitar 10 or the entire guitar 10 by pushing the master strobe button 96. Thus, if a guitarist was going to play a slow song he/she can push several strobe buttons 94 on the back of the guitar 10; if the guitarist were going to play a fast song with a heavy lead part the guitarist could press the button strobe switch 36 and the LED power button 78 for lighting up the head 12 and the neck 14 of the guitar 10; and when the guitarist came to the fast lead part he/she could press the master strobe button 96 to illuminate the entire guitar 10.

As shown in FIG. 3, the guitar 10 also includes a support rod 128 pivotally mounted to the rear 22 of the guitar 10 for supporting the guitar 10 in a generally upright position; and more specifically, pivotally mounted to the rear of the body 20. The support rod 128 is pivotally mounted to the body 20 by a hinge pin 130, and when the rod 128 is not in and is folded against the body 20 of the guitar 10, a magnetic clasp 132 holds the support rod 128 in place and prevents the rod 128 from accidentally unfolding.

Although the invention has been described in complete detail and pictorially shown in the accompanying drawings it is not to be limited to such details since numerous alterations, modifications, and variations may be made to the invention without departing from the spirit and scope thereof; hence, the invention is described to cover any and all modifications that may come within the language and scope of the appended claims.

I claim:

1. A guitar, comprising:

a head;

a neck having an upper end for connection to the head, and an opposite lower end;

a body interconnected to the neck at the lower end thereof;

the body having a sound hole and an internal cavity with the internal cavity defined by radiused corners;

a bridge mounted on the body adjacent the sound hole and the bridge including an interior end that extends into the body;

a rod extending through the neck for interconnection to the interior end of the bridge;

the neck substantially coequal in length with the rod and also extending to the bridge;

a fret board disposed upon the neck and coequal in length thereto and the fret board being composed of fiberglass;

a plurality of red transparent fret markers spaced along the length of the fret board;

a plurality of fret marker lights contained within the neck and spaced therealong so that at least one fret marker light is located beneath each red transparent fret marker for illuminating the fret markers and the fret board;

the rod terminating with a t-shaped portion that interconnects to the bridge so that sound vibrations are conveyed down through the guitar by the rod when the guitar is played and not just off the top of the guitar;

a head strobe light located in the head for illuminating the head of the guitar;

a pair of opposed cutaways integrally formed from the body and extending along the lower end of the neck for providing access to the fret board at the lower end of the neck;

a plurality of cutaway strobe lights located on the cutaways for illuminating the body of the guitar; and a master strobe button mounted on the body and electrically interconnected to the head strobe light, the fret marker lights, and the cutaway strobe lights, all of which simultaneously light upon pressing the master strobe button so that the entire guitar is illuminated.

2. The guitar of claim 1 further comprising a push button strobe switch mounted on the head and electrically connected to the head strobe light and which is pressed to illuminate the head strobe light.

3. The guitar of claim 2 further comprising a LED power button mounted on the body and electrically connected to the fret marker lights and which is pressed to illuminate the fret marker lights.

4. The guitar of claim 3 wherein a red transparent plastic material covers the head and through which illumination from the head strobe light passes for creating an appealing visual effect.

5. The guitar of claim 4 wherein the body is further defined by a front and a rear with the sound hole, the master strobe button, the LED power button, and the cutaway strobe lights being located on the front of the body.

6. The guitar of claim 5 wherein a red transparent plastic material is used to cover the front and the rear of the body.

7. A guitar, comprising:

a head;

a neck having an upper end for connection to the head, and an opposite lower end;

a body interconnected to the neck at the lower end thereof;

the body having a sound hole and an internal cavity with the internal cavity defined by a plurality of radiused corners;

a bridge mounted on the body adjacent the sound hole and the bridge including an interior end that extends into the body;

a rod extending through the neck for interconnection to the interior end of the bridge;

the neck substantially coequal in length with the rod and the neck also extending to the bridge;

a fret board disposed upon the neck and coequal in length thereto and the fret board being composed of fiberglass;

a plurality of red transparent fret markers spaced along the length of the fret board;

a channel extending along the neck and coequal in length with the fret board;

a plurality of fret marker lights contained within the channel and spaced therealong so that at least one fret marker light is located beneath each red transparent fret marker for illuminating the fret markers, the fret board, and the neck;

the rod terminating with a t-shaped portion that is interconnected to the bridge so that sound vibrations are conveyed down through the guitar by the rod when the guitar is played and not just off the top of the guitar;

a head strobe light located in the head for illuminating the head of the guitar;

a pair of opposed cutaways integrally formed from the body and extending along the lower end of the neck for providing access to the fret board adjacent the lower end of the neck;

a plurality of cutaway strobe lights located on the cutaways for illuminating the body of the guitar; and a master strobe button mounted on the body and electrically interconnected to the head strobe light, the fret marker lights, and the cutaway strobe lights, and all of which simultaneously light upon pressing the master strobe button for illuminating the entire guitar.

8. The guitar of claim 7 further comprising a push button strobe switch mounted on the head and which is electrically interconnected to the head strobe light and which is pressed to illuminate the head strobe light.

9. The guitar of claim 8 further comprising a LED power button mounted on the body and electrically connected to the fret marker lights and which is pressed to illuminate the fret marker lights.

10. The guitar of claim 9 wherein a red transparent plastic material covers the head and through which illumination from the head strobe light passes for creating an appealing visual effect.

11. The guitar of claim 10 wherein the body is further defined by a front and a rear with the sound hole, the master strobe button, the LED power button, and the cutaway strobe lights being located on the front of the body.

12. A guitar, comprising:

a head;

a neck having an upper end for connection to the head, and an opposite lower end;

a body interconnected to the neck at the lower end thereof;

the body having a sound hole and an internal cavity with the internal cavity defined by a plurality of radiused corners;

a bridge mounted on the body adjacent the sound hole and the bridge including an interior end that extends into the body;

a rod extending through the neck for interconnection to the interior end of the bridge;

the neck substantially coequal in length with the rod and also extending to the bridge;

a fret board disposed upon the neck and coequal in length thereto and the fret board being composed of fiberglass;

a plurality of red transparent fret markers spaced along the length of the fret board;

a plurality of fret marker lights contained within the neck and spaced therealong so that at least one fret marker light is located beneath each red transparent fret marker for illuminating the fret markers and the fret board;

the rod terminating with a t-shaped portion that interconnects to the bridge so that sound vibrations are conveyed down through the guitar by the rod when the guitar is played and not just off of the front of the guitar;

a head strobe light located in the head for illuminating the head of the guitar;

a pair of opposed cutaways integrally formed from the body and extending along the lower end of the neck for providing access to the fret board at the lower end of the neck;

a plurality of cutaway strobe lights located on the cutaways for illuminating the body of the guitar;

a LED power button mounted on the body and electrically connected to the fret marker lights and which is pressed to illuminate the fret marker lights; and a master strobe button mounted on the body and electrically interconnected to the head strobe light, the fret marker lights, and the cutaway strobe lights, and all simultaneously light upon the pressing the master strobe button for illuminating the entire guitar.

13. The guitar of claim 12 further comprising a push button strobe switch mounted on the head and electrically connected to the head strobe light and which is pressed to illuminate the head strobe light.

14. The guitar of claim 13 wherein a red transparent plastic material covers the head and through which illumination from the head strobe light passes for creating an appealing visual effect.

15. The guitar of claim 14 wherein the body is further defined by a front and a rear with the sound hole, the master strobe button, the LED power button, and the cutaway strobe lights being located on the front of the body.

16. The guitar of claim 15 wherein the bridge further includes a plurality of bridge string guides with each bridge string guide supporting one guitar string under tension.

17. The guitar of claim 16 wherein the bridge further includes a plurality of tubes with each tube connected to the t-shaped portion of the rod and upwardly extending therefrom.

18. The guitar of claim 17 wherein the bridge includes a plurality of intermediate members with each intermediate member threadably engaged to one tube and capable of selective linear adjustable movement within the respective tube for adjusting the corresponding guitar string.

19. The guitar of claim 18 wherein the bridge includes a plurality of wrench turning heads with each wrench turning head fixedly mounted to each respective intermediate member and each wrench turning head having a centrally located mounting pin projecting upwardly therefrom so that rotation of the wrench turning head results in the concomitant rotation of the intermediate member whereupon the wrench turning head and the intermediate member to which it is fixed rotate and move together.

20. The guitar of claim 19 wherein the bridge includes a plurality of string holders with each string holder rotatably mounted to a respective mounting pin and each string holder having an aperture through which one guitar string passes so that the string holder doesn't rotate when the intermediate member and the wrench turning head are rotated for adjusting the height of the guitar string above the body.

* * * * *